United States Patent [19]

Willinger et al.

[11] Patent Number: 5,034,165
[45] Date of Patent: Jul. 23, 1991

[54] AIR STONE

[75] Inventors: Allan H. Willinger, Oakland; Chen-Chiao Wang, Montvale, both of N.J.

[73] Assignee: Willinger Brothers, Inc., Oakland, N.J.

[21] Appl. No.: 558,694

[22] Filed: Jul. 26, 1990

[51] Int. Cl.⁵ .................... C10J 1/08; A01K 63/00
[52] U.S. Cl. .................................. 261/122; 119/5
[58] Field of Search .............. 119/5; 261/94, 121.1, 261/121.2, 122; 210/169, 416.2

[56] References Cited

U.S. PATENT DOCUMENTS

| | | | |
|---|---|---|---|
| 2,786,026 | 3/1957 | Stark | 210/169 |
| 3,261,471 | 7/1966 | Halpert | 119/5 X |
| 3,529,574 | 9/1970 | Kelley et al. | 119/5 |
| 3,616,919 | 11/1971 | Feddern et al. | 210/169 |
| 3,746,169 | 7/1973 | Willinger et al. | 210/169 X |
| 4,192,255 | 3/1980 | Willinger | 119/5 |
| 4,385,989 | 5/1983 | Margolis | 119/5 X |

FOREIGN PATENT DOCUMENTS

| | | | |
|---|---|---|---|
| 2243902 | 3/1974 | Fed. Rep. of Germany | 119/5 |
| 2842865 | 4/1980 | Fed. Rep. of Germany | 119/5 |

Primary Examiner—Robert P. Swiatek
Assistant Examiner—Todd E. Manahan
Attorney, Agent, or Firm—Helfgott & Karas

[57] ABSTRACT

An air stone suitable for use in aerating water in an aquarium is formed of a body of porous material permeable to air. Included within the body is a central chamber having an inlet port for receiving a connector, the chamber extending beyond the port to form a plenum for distribution of air throughout the air stone. In an embodiment of the air stone constructed with a circular cylindrical configuration, the plenum is enclosed by a cylindrical wall of porous material and closed off by an end wall of porous material. The cylindrical wall has uniform thickness equal to the thickness of the end wall. The connector includes a nipple extending into the chamber to make a press fit for securing the stone to the connector. A similar nipple directed in the opposite direction secures the connector to an air-supply tube. The uniform distribution of air within the stone provides for a uniform distribution of bubbles formed throughout the outer surface of the stone, which distribution of bubbles is useful for conveying water through a lift tube in an aquarium. A spider formed of a plurality of radially extending arms may be formed on the connector to center the air stone within the lift tube.

15 Claims, 2 Drawing Sheets

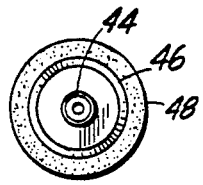
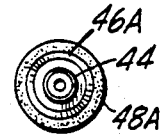
FIG.4C  FIG.5C
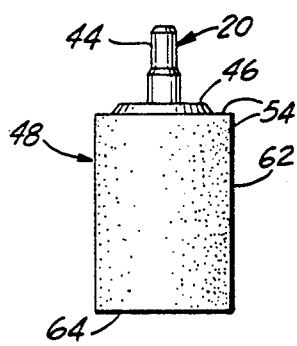 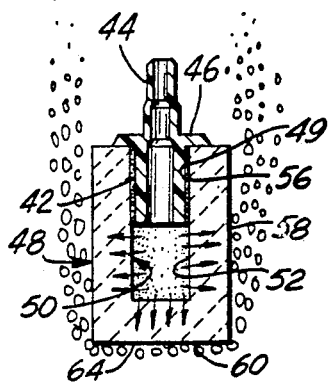 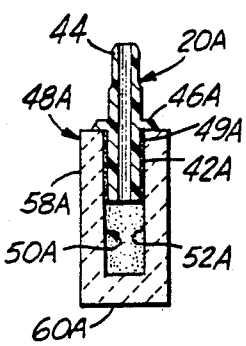
FIG.4A  FIG.4B  FIG.5A  FIG.5B
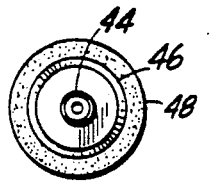 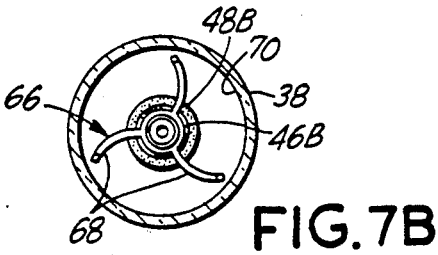
FIG.6C  FIG.7B
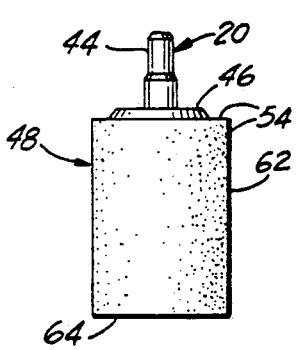 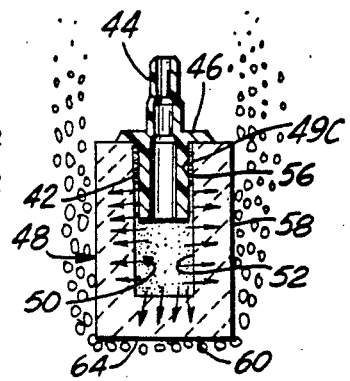 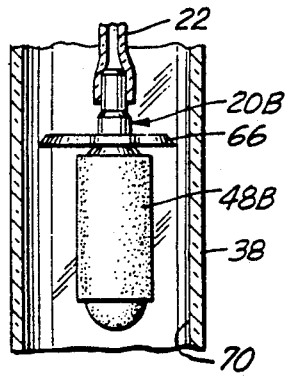
FIG.6A  FIG.6B  FIG.7A

AIR STONE

BACKGROUND OF THE INVENTION

This invention relates to an air stone for dispensing bubbles of a gas into a fluid and, more particularly, to an air stone for dispensing air into the water of an aquarium, and wherein the air stone is configured with an extended interior chamber with a barrier for improved dispersion of the air throughout the stone.

Air stones are employed frequently for aerating the water of an aquarium to provide oxygen for fish and other marine life which may be present in the aquarium. The air stone is constructed of a body of porous material through which air can propagate and, in a typical installation in an aquarium, is connected via a flexible air tubing to an air pump located outside of the aquarium. The pump pumps air via the tubing into the air stone which disperses the air to form a stream of bubbles which migrate upwardly through the water. The air stone may also be placed within the lift tube of an aquarium undergravel filter to allow an entrained stream of bubbles to draw water through the lift tube and, thereby, circulate water through the filter.

It is noted that the construction of the air stone permits its use in situations, other than that of the foregoing aquarium, in which it is desired to disperse a gas within a fluid. However, for purposes of demonstrating the use of the invention, it is presumed that the air stone is to be employed for aeration of water in an aquarium.

A problem arises in the construction of air stones in that air forced into the stone tends to propagate through a portion of the porous material of the stone located generally in the vicinity of the air inlet to the stone, while the remaining portion of the body of porous material is essentially inactive in the process of dispersing the air. As a result, there is a significant diminution in the esthetic appearance to the paths of bubbles emanating from the air tone because the bubbles emanate only from the upper portion of the stone rather than emanating uniformly from the entire exterior surface of the stone. In addition, there is usually a mineral build up at the end of the air inlet into the stone which starts to clog after a while. Also, since the path of air is only through the upper part of the stone, the underutilization of the lower portion of the air stone results in a more rapid clogging and wearing of the upper portion of the air stone resulting in the more frequent need for replacing the air stone.

Frequently, it is desirable to use large air stones in the aquarium in order to prevent riding up of the tubing. However, in using the large air stones the aesthetic appearance is worsened since the air bubbles out from only the very top of the air stone because of its large size and because the air seeks the shortest path of resistance through the stone. One solution of extending the flow of bubbles to emanate along the length of the air stone is to use a more dense air stone. However, in doing so you require more pressure from the pump to drive the high density air stone.

SUMMARY OF THE INVENTION

The aforementioned problems are overcome and other advantages are provided by an air stone formed of a body of porous, air-permeable material and wherein, in accordance with the invention, a chamber is formed within a central region of the body with a barrier layer along at least a part of the chamber. The chamber is bounded by a wall of the porous material, the wall being essentially of uniform thickness so that air can propagate from the chamber uniformly throughout the wall to exit the air stone. Connection of an external air conduit, such as a flexible plastic tubing, is made by a hollow connector having an end fitting in the shape of a cylindrical stem which is inserted through the wall to communicate with the chamber. A barrier layer such as an adhesive surrounds the stem in the chamber. The chamber extends well beyond a terminus of the stem to expose the inner surface of the wall to the air for uniform dispersion of the air throughout the portion of the air stone surrounding the chamber and below the barrier layer.

Typically, the air will initially flow out of the lower part of the air stone. However, the bubbles emanating from the lower part will flow upward along the air stone so that the entire air stone will appear engulfed with air bubbles to provide an improved aesthetic appearance.

At the same time there will result an improved utilization of the air stone since as the lower part of the stone gets clogged, the air flow from the air stone will move upward along the air stone. Furthermore, large air stones can now be used (even) of low density and still there will result a flow from the lower part of the air stone so the entire stone will be engulfed with bubbles.

The principle of construction of the air stone, in accordance with the invention, applies to air stones of various shapes including, by way of example, a cylindrically shaped stone with a cylindrical chamber, and a spherically shaped stone with a spherical chamber. To facilitate manufacture of the air stone, and to provide an air stone in a configuration normally employed with lift tubes of air filters, a preferred embodiment of the invention is constructed with a generally cylindrical body of porous material, and with a cylindrical chamber. The chamber opens at one end of the cylindrical body to form an inlet port for receiving the stem of the connector of the air conduit. The chamber extends toward the opposite end of the cylindrical body wherein the chamber is terminated by an end wall of the porous material. A thickness of the end wall is, preferably, equal to that of a cylindrical sidewall encircling the chamber to encourage uniform dispersion of the air. Also, if desired, the connector can be provided with an array of outwardly extending arms, in the form of a spider, useful in centering the air stone along the axis of the lift tube of a filter.

The stem is coated with an adhesive material and then inserted into the chamber. The adhesive material forms a resistance barrier thereby causing the air to flow out of the chamber in that part of the air stone below the adhesive material. Typically, the adhesive will cover the entire stem. However, the actual length of the stem covered by the adhesive can be varied depending upon the density of the air stone material.

BRIEF DESCRIPTION OF THE DRAWING

With the above and additional objects and advantages in view, as will hereinafter appear, this invention comprises the devices, combinations and arrangements of parts hereinafter described by way of example and illustrated in the accompanying drawings of a preferred embodiment in which:

FIGS. 4A, 4B, and 4C show, respectively, an elevation view, a sectional view, and a top view of an air stone constructed in accordance with the invention;

FIGS. 5A, 5B, and 5C show, respectively, an elevation view, a sectional view, and a top view of an embodiment of an air tone of the invention having a narrower configuration than that of FIG. 4A;

FIGS. 6A, 6B, and 6C show, respectively, an elevation view, a sectional view, and a top view of an embodiment of air stone of the invention having a limited barrier layer along the stem;

FIG. 7A shows a further embodiment of the air stone of the invention which includes a set of arms extending radially in the form of a spider for positioning the air stone within an air-lift tube, the latter being cut away to show the air stone in side elevation view; and FIG. 7B is a top plan view of the air stone disposed within a section of the lift tube of FIG. 7A.

DETAILED DESCRIPTION

Figure 1:
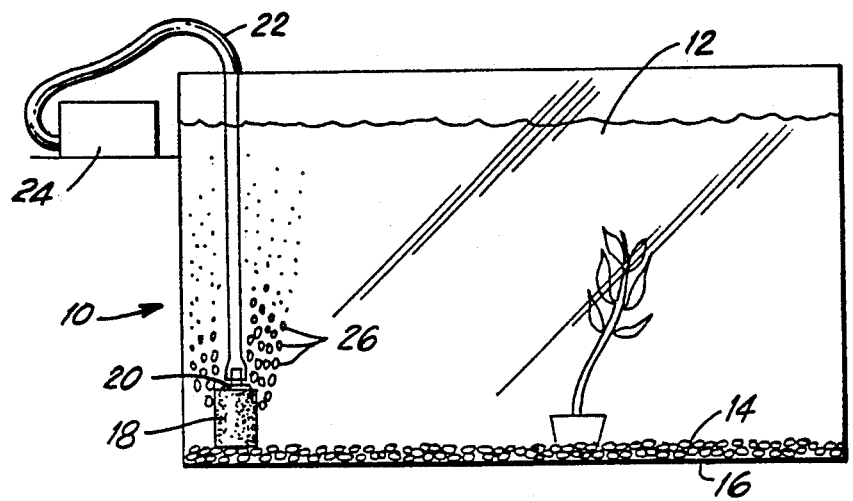
FIG. 1 is a stylized elevation view of an aquarium formed of a tank having transparent sidewalls, and including an air stone for dispensing air into water in the aquarium.

FIG. 1 shows an aquarium tank 10 constructed of transparent glass walls and holding water 12 for support of marine life. A layer of gravel 14 is disposed on a bottom wall 16 of the tank 10. An air stone 18 rests upon the gravel 14, and is connected by a connector 20 to an air inlet conduit constructed as a flexible plastic tubing 22. An air pump 24 located outside of the tank 10 is connected to the tubing 22 for pumping air into the air stone 18. The air stone is fabricated of a porous material which is held together by a cement, such as a one part acrylic adhesive material. The air stone is permeable to air. The density of the air stone can be varied. However, generally, the greater the density the more air pressure will be needed. Air delivered by the pump 24 through the tubing 22 permeates through the pores of the material of the air stone 18 to be dispersed and to emit bubbles 26 along the outer surface of the air stone 18. The bubbles 26 migrate upwards through the water 12 to aerate the Water and to introduce a movement to the water by virtue of entrainment of the bubbles within the water.

Figure 2:
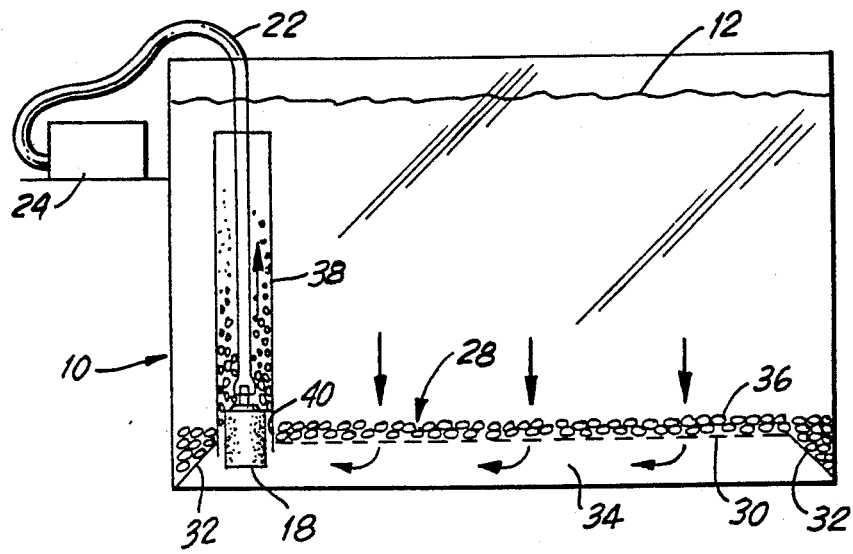
FIG. 2 is a stylized elevation view of the aquarium in FIG. 1 provided with an undergravel aquarium filter and an air lift tube in which is placed the air stone for drawing water through the filter.

FIG. 2 shows both aeration and filtration of the water 12 in the aquarium tank 10. An undergravel aquarium filter 28 is installed in the bottom of the aquarium tank 10. The filter 28 comprises a perforated plate 30 having depending leg portions 32 along the outer edges of the plate 30 for supporting the plate 30 parallel to and spaced apart from the bottom wall 16 to form therewith a chamber 34. A layer of gravel 36 is disposed along the top surface of the perforated plate 30. An air-lift tube 38 submerged within the water 12 is oriented vertically, and passes through the layer of gravel 36 to be seated within an aperture 40 of the plate 30. The aperture 40 allows the tube 38 to communicate with the chamber 34. The air stone 18 with the air-supply tubing 22 are disposed within the lift tube 38 with the air stone 18 being located adjacent the bottom of the lift tube 38.

In operation of the filter 28, bubbles 24 emanate from the air stone 18, become entrained in a column of water within the lift tube 38, and introduce an upward flow of water within the lift tube 38 as the bubbles migrate upwards through the lift tube 38. As the water flows upward through the lift tube 38, water from the chamber 34 enters the bottom of the lift tube 38, and other water from the central region of the tank 10 moves downward through the layer of gravel 36 and through perforations of the plate 30 into the chamber 34. Thus there is a circulation of water about the tank 10, circulated water passing through the filter 28 to produce clear water within the chamber 34. The gravel 36 and the perforated plate 30 serve to filter debris and pollutants from the aquarium water while the air stone 18 aerates the water to provide oxygen for marine life which may be placed in the aquarium tank 10.

Figure 3:
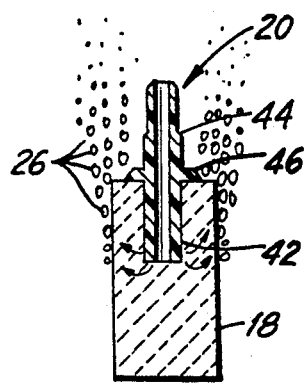
FIG. 3 is a sectional view of an air stone showing conventional construction of an air stone in accordance with the prior art.

FIG. 3 shows an enlarged sectional view of the air stone 18 providing further detail in the construction of air stones in accordance with the prior art, including affixation of the connector 20 to the stone 18. The connector 20 comprises a stem 42 and a nipple 44 extending in the opposite direction to the stem 42, the stem and nipple 42 and 44 being joined at a central portion of the connector 20. The central portion of the connector 20 is formed as a collar 46. The stem 42 is press fit into the porous material of the air stone 18 up to the collar 46, the collar 46 serving as a stop to insertion of the stem 42. The nipple 44 is to be inserted into the air-supply tubing 22 up to the collar 46, the collar 46 serving as a stop for insertion of the nipple 44 into the tube 22. The connector 20 is fabricated of a flexible material, such as rubber, plastic, or the like which is impervious to water and makes a press fit securely with both the stone 18 and a tubing 22, connections with the stone 18 and the tubing 22 being both air tight and water tight.

As depicted in FIG. 3, the bubbles 26 emanate from the upper portion of the air stone 18 in the vicinity of the air output of the stem 42. This occurs because the propagation path of air through the porous material as shown by the arrows is relatively short in the vicinity of the stem 42, and relatively long in a direction downward from the stem 42 towards the bottom of air stone 18. Resistance to passage of air through the porous material of the stone 18 increases with propagation distance. Thus, all or nearly all of the bubbles 26 appear in the upper portion of the stone 18 while virtually no bubbles appear at the lower portion of the stone 18.

The extent from which the bubbles leave from the exterior surface of the air stone depends upon a combination of factors including the density of the air stone and the amount of air pressure supplied. For a denser air stone, and with sufficient air supply, bubbles can be forced to leave from a lower portion of the air stone. However, this requires considerable additional pressure which is often not available in aquarium systems. This is especially a problem where large air stones are utilized. Frequently, such large air stones are desirable in order to keep the air tubing down and prevent it from bobbing upward. However, with such large air stones being very densed, the amount of air pressure required to drive the air out of the lower portions of the air stone becomes impractical to achieve with regular air pumps and, would tend to damage the air pump if driven so hard. Accordingly, typically with standard air stones the bubbles only leave from the upper part of the air stone as shown in FIG. 3.

This presents a poor aesthetic appearance to the air stone. Additionally, since only the upper portion is being utilized, it tends to clog and once it clogs, it retards the flow of air. It also presents a none uniform utilization of the material of the air stone since the bottom half is hardly used. This becomes a further problem since at the exit of the stem, there tends to be a mineral build-up as a result of the content of the water and this further clogs the flow of air so that after a while the standard air stone becomes a poor supply of airation to the aquarium tank.

In accordance with the invention, and with reference to FIGS. 4A, 4B, and 4C, the foregoing disadvantage of the air stone of the prior art is overcome by an air stone 48 constructed to provide for essentially equal length paths of propagation of air in the porous material of the stone 48 in the lower part of the stone 48. This is accomplished by constructing the air stone 48 with a central chamber 50 having a cylindrical cross section for receiving the connector 20, and wherein the chamber 50 extends beyond the terminus of the stem 42 at least into the bottom half of the air stone, to form a plenum 52 by which air can be distributed through the air stone 48. In the preferred embodiment of the air stone 48, the stone 48 is configured as a right circular cylinder, and the chamber 50 is also configured as a right circular cylinder. The portion of the chamber 50 extending to form the plenum 52 at a top end 54 of the stone 48 serves as an inlet port 56 of the chamber 50 for receiving the connector 20. The configuration of the right circular cylinder employed in the construction of the preferred embodiment of the air stone 48 facilitates manufacture of the stone 48. However, the principles of the invention apply also to chambers having some other shape, for example, wherein the plenum 52 is spherical (not known) and opens to the top end 54 by way of a cylindrical passage which serves as the inlet port 56.

In the construction of the air stone 48, the stone 48 comprises a cylindrical sidewall 58 which encloses and defines the chamber 50, and a lower end wall 60 which closes off the lower end of the chamber 50. Preferably, the thickness of the lower end wall 60 is equal to the thickness of the sidewall 58 so as to provide for equality of propagation paths for air propagating from the chamber 50 through the porous material of the stone 48. This enables the air to exit in dispersed fashion as the bubbles 26 from an outer surface of the stone 48, as shown by the arrows in FIG. 4B.

In inserting the stem 42 into the port 56 of the chamber 50, the stem is coated with a barrier layer, typically adhesive material 49 and secured within the chamber 50. The adhesive material can be of the same type of cement that is used to retain the air stone material together which can be a one part acrylic material without the use of any catalyzers. As shown in FIG. 4B, the entire length of the stem is coated and then inserted into the chamber. However, as will be described hereinafter, the extent of the coating can vary dependent upon the density of the air stone material.

As a result of the barrier layer 49, the flow of air it receives a greater resistance to flow in the upper half of the air stone material. As a result, the air leaving from the stem enters into the plenum 52 formed within the chamber 50 and disperses through the walls of the air stone in the lower half of the air stone. Because the side walls and bottom wall thickness of the air stone material surrounding the plenum is substantially equal, air will leave equally from the side walls below the stem and the bottom wall.

As depicted in FIG. 4B, the generation of bubbles will be emitted from the lower half of the outer surface of the air stone including the lower end 64 and the bottom of the sides of the air stone. These bubbles will then flow upwardly coating the entire surrounding of the air stone. It will therefore appear that the entire air stone is completely engulfed in bubbles with the bubbles appearing around all sides of the air stone, including the bottom and the entire surrounding wall. This provides for a pleasing aesthetic appearance to the air stone 48 when used in aquariums both with an air lift tube, such as the tube 38 of FIG. 2, or without an air lift tube as depicted in FIG. 1. In addition, since initially the air flows out of the lower half, the bottom part of the air stone is fully utilized. Even as the bottom half becomes clogged, the flow of air will then be forced upward around the barrier so that air can still leave from the upper part when the lower half becomes clogged. Of course, at that point, it will be desirable to change the air stone. However, this provides substantial uniform utilization of the entire air stone material until the air stone is changed.

FIGS. 5A, 5B, and 5C show an air stone 48A which is an alternative configuration to the air stone 48 of FIGS. 4A, 4B, and 4C. The air stone 48A has the same basic components as the air stone 48, and is securable by a connector 20A to the air supply tubing 22. In the air stone 48A, there is a cylindrical chamber 50A of narrower diameter than the chamber 50, there being a corresponding difference in the diameter of a stem 42A of the connector 20A and the stem 42 of the connector 20. The connector 20A has a collar 46A of smaller diameter than the collar 46 of the connector 20. The chamber 50A of the air stone 48A extends beyond the end of the stem 42A via a plenum 52A to provide for a distribution of the air of the chamber 50A throughout the lower part of the air stone 48A, and to provide for equality of propagation path lengths through a lower sidewall 58A and a bottom end wall 60A. The barrier layer of adhesive 49A surrounds the stem 42A. Therefore, the principles of operation of the invention, as described with reference to the air stone 28 apply also to the air stone 48A which has a narrower configuration.

Refer now to FIGS. 6A, 6B, and 6C. There is shown an air stone identical to that shown in FIGS. 4A, 4B, and 4C, and similar parts are identically identified. However, in this case the barrier layer of adhesive 49C, is shown to only partially extend along the length of the stem 42. The air stone of FIGS. 6A–6C can be formed of more densed material and as a result, the amount of the barrier layer can be varied to conform to the density. The extent of the barrier layer can be found imperically by testing various types of densities. However, one of the features of the invention is that the use of the barrier layer provides a control in order to be sure that the bubbles emanate from the lower part of the air stone regardless of the density. In this way, even for denser air stones, there is not needed a greater supply of air, but through the control of the barrier layer of adhesive material, the bubbles can still be directed to emit from the lower half of the air stone. Such lower half emission of the bubbles serves to cause the bubbles to flow upwardly and engulf the entire air stone making for a pleasing aesthetic appearance and providing greater efficient utilization of the air stone material.

FIGS. 7A and 7B show emplacement of the air stone 48B within the air-life tube 38 of FIG. 2. The diameter of the air stone 48B is substantially less than the inner diameter of the lift tube 38. Accordingly, to facilitate locating the air stone 48B along a central axis of the lift tube 38, there is provided an additional feature of the invention comprising a spider 66 located at the central region of the connector 20B immediately above the collar 46B. The spider 66 comprises a set of arms 68, three such arms 68 being shown by way of example. The arms 68 are disposed symmetrically about a longitudinal axis of the connector 20B, and extend radially towards an inner surface 70 of the lift tube 38. The outer ends of the arm 68 are retracted a sufficient distance from the inner surface 70 to provide clearance between the spider 66 and the lift tube 38 to facilitate a positioning of the air stone 48B within the lift tube 38. Centering the air stone 48B within the lift tube 38 is advantageous for providing a symmetric distribution of the bubbles 26 around the air stone for improved lift of water within the lift tube 38. The bubbles 26 can flow readily through the spaces between the arms 68 to carry the water upwards through the lift tube 38.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. An air stone comprising:
   a body of porous material;
   a chamber disposed within a central region of said body, the chamber being bounded by a wall of the porous material;
   a hollow connector for connecting a conduit of gas to said body, the connector having a stem extending into said body and communicating with said chamber;
   wherein said chamber extends beyond a terminus of said stem to act as a plenum for the gas thereby exposing said wall to the gas to facilitate wider dispersion of the gas within said wall during a passage of the gas through said wall, and
   a barrier layer positioned within said body and extending around and over at least a portion of a length of said stem between said stem and a wall of said chamber, said layer being made of a material providing a greater resistance to a gas flow so as to cause the dispersion of the gas through the porous wall beyond the stem.

2. An air stone according to claim 1, wherein said chamber extends to more than half the length of said body.

3. An air stone according to claim 1, wherein said wall has substantially uniform thickness to provide for a uniform rate of dispersion of the gas through the portion of the air stone beyond the stem.

4. An air stone according to claim 3, where in said stem is cylindrical in shape.

5. An air stone according to claim 3, wherein said air stone has a cylindrical shape, and said chamber has a cylindrical shape;
   said wall comprises a cylindrical wall section enclosing said chamber and an end wall section closing off an end of said chamber, said cylindrical wall section and said end wall section having substantially equal thickness; and
   said gas is air, said connector is fabricated of a water impervious material to allow delivery of air to said chamber during a submersion of said air stone in water, propagation of air through said wall producing bubbles of air in the water along an outer surface of the air stone.

6. An air stone according to claim 5, wherein said chamber extends to at least more than half the length of the cylindrical air stone.

7. An air stone according to claim 6, wherein said chamber comprises an inlet port at a top end of said chamber for receiving the stem of said connector, and wherein the remainder of said chamber serves as a plenum for distribution of air throughout the air stone.

8. An air stone according to claim 7, wherein said stem extends to at least one half of the chamber.

9. An air stone according to claim 7, wherein said end wall section has a semi-spherical shape.

10. An air stone according to claim 1, wherein the barrier layer extends the entire length of the stem.

11. An air stone according to claim 1, wherein the length of the barrier layer along the stem is dependent upon the density of the porous material.

12. An air stone according to claim 1, wherein said barrier layer comprises adhesive material.

13. An air stone according to claim 12, wherein said adhesive material is the same as the material used to bond the porous material in the air stone.

14. An air stone according to claim 1, further comprising spider means symmetrically disposed about the air stone to allow a centering of the air stone within an external fluid conduit.

15. An air stone according to claim 14, wherein said spider means comprises a set of arms extending symmetrically from said connector at a location external to said body, said fluid conduit being a lift tube for an aquarium.

* * * * *